(12) United States Patent
Shimano et al.

(10) Patent No.: US 7,732,693 B2
(45) Date of Patent: Jun. 8, 2010

(54) RESIN-FORMED BODY INCLUDING WOOD POWDER PRODUCTION METHOD OF THE SAME AND BLACK KEY FOR KEYBOARD MUSICAL INSTRUMENT

(75) Inventors: Syoji Shimano, Hamamatsu (JP); Nobuhiko Suzuki, Fukuroi (JP)

(73) Assignee: Yamaha Corporation, Shizuoka-Ken (JP)

( * ) Notice: Subject to any disclaimer, the term of this patent is extended or adjusted under 35 U.S.C. 154(b) by 0 days.

(21) Appl. No.: 11/828,078

(22) Filed: Jul. 25, 2007

(65) Prior Publication Data
US 2008/0039559 A1  Feb. 14, 2008

(30) Foreign Application Priority Data
Jul. 25, 2006 (JP) .............................. 2006-201983

(51) Int. Cl.
G10C 3/12 (2006.01)
C08L 97/02 (2006.01)
C08L 55/02 (2006.01)
C08L 25/12 (2006.01)

(52) U.S. Cl. .................. 84/443; 84/452 P; 524/13; 524/565; 524/575; 524/577

(58) Field of Classification Search ............ 524/13, 524/565, 575; 84/423 R, 443
See application file for complete search history.

(56) References Cited

U.S. PATENT DOCUMENTS

| | | | | |
|---|---|---|---|---|
| 2,221,511 A | * | 11/1940 | Fiedler et al. | 528/1 |
| 2,736,224 A | * | 2/1956 | Trinkle | 84/202 |
| 2,970,121 A | * | 1/1961 | Schmittberger | 524/13 |
| 3,888,810 A | * | 6/1975 | Shinomura | 524/13 |
| 5,020,282 A | * | 6/1991 | Okajima et al. | 451/541 |
| 5,064,592 A | * | 11/1991 | Ueda et al. | 264/112 |
| 5,137,941 A | * | 8/1992 | Oshima | 523/222 |
| 5,223,652 A | * | 6/1993 | Ishida et al. | 84/427 |
| 5,559,297 A | * | 9/1996 | Yoshikawa et al. | 84/433 |
| 7,067,730 B2 | * | 6/2006 | Inoue | 84/423 R |
| 2004/0076847 A1 | * | 4/2004 | Saunders et al. | 428/535 |

(Continued)

FOREIGN PATENT DOCUMENTS

CN    1603088 A    4/2005

(Continued)

OTHER PUBLICATIONS

Sakai et al. (JP 5-73030) Mar. 1993; abstract and translation in English.*

(Continued)

Primary Examiner—David Wu
Assistant Examiner—Rip A. Lee
(74) Attorney, Agent, or Firm—Dickstein Shapiro LLP (57) ABSTRACT

In order to provide a resin-formed body including wood powder which is applicable to a material for a black key having a good external appearance and which has touch close to real wood with less difference in quality without using rare wood, the resin-formed body including wood powder (1) includes colored wood powder, resin and pigment. Moreover, with respect to the resin-formed body including wood powder (1), it is possible to use a mass ratio between the wood powder and the resin so as to be 90/10-60/40.

4 Claims, 5 Drawing Sheets

U.S. PATENT DOCUMENTS

2004/0170818 A1* 9/2004 Stucky et al. .............. 428/304.4
2006/0219085 A1* 10/2006 Kamijima et al. .............. 84/438

FOREIGN PATENT DOCUMENTS

| | | | |
|---|---|---|---|
| CN | 1603098 A | | 4/2005 |
| CN | 1603098 | * | 6/2005 |
| GB | 393141 | | 6/1933 |
| GB | 189424707 | | 4/1985 |
| JP | 62196101 | | 8/1987 |
| JP | 2-105872 | * | 4/1990 |
| JP | 5-73030 | * | 3/1993 |
| JP | 5-073030 | | 3/1993 |
| JP | 11217920 | | 8/1999 |
| JP | 2001-353707 A | | 12/2001 |
| JP | 2002-194223 | * | 7/2002 |
| JP | 2002-331521 A | | 11/2002 |
| KR | 2002-0048353 | | 6/2002 |
| TW | 385324 | | 3/2000 |
| TW | 466167 | | 12/2001 |
| WO | WO-03/099539 A1 | | 12/2003 |
| WO | WO 2005/083673 A1 | * | 9/2005 |

OTHER PUBLICATIONS

Irie et al. (JP 2002-194223) Jul. 2002; abstract and translation in English.*
Pape, R. (GB 24,707; provisional specification) Apr. 6, 1895.*

* cited by examiner

RESIN-FORMED BODY INCLUDING WOOD POWDER PRODUCTION METHOD OF THE SAME AND BLACK KEY FOR KEYBOARD MUSICAL INSTRUMENT

BACKGROUND OF THE INVENTION

1. Field of the Invention

The present invention relates to a resin-formed body including wood powder, a production method of the resin-formed body including wood powder and a black key for a keyboard musical instrument made from the resin-formed body including wood powder.

Priority is claimed on Japanese Patent Application No. 2006-201983, filed Jul. 25, 2006, the content of which is incorporated herein by reference.

2. Description of the Related Art

In a conventional art, ebony or a black wood was used as a material of a black key for a keyboard musical instrument such as a piano. A black key made from the ebony has advantages of surface hardness, applicability to playing, feeling of touch, and external appearance such as color. However, ebony is a rare wood, and there is a possibility that ebony cannot be obtained in the future. Moreover, ebony is expensive.

In order to solve such a problem, there is a proposal (for example, see Japanese Unexamined Patent Application, First Publication No. H05-73030, hereinafter Patent Document 1) in which, instead of using ebony as a material for a black key, a wood black key is applied which includes a resinified portion that is produced by heat-curing after injecting an impregnating solution made from both a black coloring matter and liquid synthetic resin to a wood under a reduced pressure.

Moreover, there is another proposal as a material for a black key in which a resin-formed body including wood powder is produced from uncolored wood powder and resin and a surface of the resin-formed body including wood powder is colored black. Moreover, there is another proposal as a material for a black key in which a resin-formed body including wood is used which is obtained by mixing both uncolored wood powder and a black colored resin.

However, in a case of using a technique disclosed in Patent Document 1, in order to satisfy applicability to playing, touch, external appearance such as color, and so on, it is necessary to use rare wood such as a kind of ebony having wood grain and Mansonia. Moreover, there is a problem in which there are differences of touch and external appearances among the obtained black keys because there are differences of quality in a case of using wood as a material for a black key. Moreover, in a case of using the technique disclosed in Patent Document 1, there is a problem in which the color becomes faded due to age deterioration because only the surface is colored, the original color of the wood appears and the external appearance is deteriorated.

Moreover, in a case of using the resin-formed body including wood powder as a black key which has a surface colored black, there is a problem in which the color becomes faded or removed along with age deterioration because only the surface is colored, an original color of the wood powder appears and an external appearance is deteriorated.

Moreover, in a case of using the resin-formed body including black colored resin as a black key, there is a problem in which the wood powder appears on the surface, the external appearance is deteriorated because of the color of the wood powder and a good external appearance cannot be obtained.

SUMMARY OF THE INVENTION

The present invention was conceived in response to the above-described problems and has an object to provide a black key for a keyboard musical instrument having a good external appearance, feel or touch close to real wood and applicable or suitable to playing with less differences in quality without using rare wood.

Moreover, the present invention has an object to provide a resin-formed body including wood powder which is appropriate for a material of a black key for a keyboard musical instrument which has a good external appearance, touch close to real wood with less differences in quality without using rare wood.

Moreover, the present invention has an object to provide a production method of the above-described resin-formed body including wood powder.

In order to achieve the above-described objects, the following constitutions are preferably applied in the present invention.

A resin-formed body including wood powder may include wood powder colored with dyestuff and resin.

In accordance with the above-described resin-formed body including wood powder, it is possible to obtain an excellent external appearance and touch close to real wood. It should be noted that, in accordance with the above-described resin-formed body including wood powder, there is no possibility in which the external appearance is deteriorated even if the wood powder appears on a surface because the wood powder is colored. Moreover, in accordance with the above-described resin-formed body including wood powder, unlike a case of coloring the surface, there is no possibility in which the external appearance is deteriorated by fading or removing of their color. Moreover, in accordance with the above-described resin-formed body including wood powder, compared to the real wood, there are less differences in quality and it is possible to achieve uniform quality. Moreover, in accordance with the above-described resin-formed body including wood powder, it is possible to produce without using rare wood.

Regarding the above-described resin-formed body including wood powder, a mass ratio between the wood powder and the resin may be 90/10-50/50 (the wood powder/resin), and more preferably 90/10-60/40.

By applying the above-described resin-formed body including wood powder, it is possible to achieve quality such as touch that is very close to real wood, and it is possible to provide sufficient surface hardness.

In order to achieve the above-described objectives, a production method of a resin-formed body including wood powder of the present invention may include: a coloring step of coloring wood powder with dyestuff; a mixing step in which the wood powder which is colored, resin and pigment are mixed in order to obtain a mixture; and a forming step of forming the mixture.

In accordance with the above-described production method of the resin-formed body including wood powder, it is possible to obtain the resin-formed body including wood powder which has a good external appearance and touch close to real wood and is applicable to playing without using rare woods.

Moreover, regarding the above described production method of a resin-formed body including wood powder, it is possible to further include a finishing step in which, after the forming step, the resin-formed body including wood powder is ground in order to be in a predetermined shape and a grain pattern is applied.

In accordance with the above-described production method of the resin-formed body including wood powder, it is possible to obtain the resin-formed body including wood powder which has a predetermined shape and which has an excellent external appearance that is further close to real wood.

Moreover, in order to achieve the above-described objectives, a black key for a keyboard musical instrument of the present invention may be made from one of the resin formed bodies including wood powder, or made from the resin-formed body including wood powder obtained by applying one of the above-described production methods of a resin-formed body including wood powder.

In accordance with the above-described black key, it is possible to achieve a good external appearance and touch close to real wood (applicable to playing) without using rare wood.

In accordance with the above-described black key, it is possible to obtain a black key with less difference in quality without using rare wood compared to black keys of keyboard musical instruments made from real wood.

In accordance with the present invention, it is possible to provide both a resin-formed body including wood powder and a production method of the same appropriate for a material of a black key which has a good external appearance and touch close to real wood with less difference in quality without using rare wood.

Moreover, in accordance with the present invention, it is possible to provide a black key which has a good external appearance and touch close to real wood and is applicable to playing with less difference in quality without using rare wood.

DETAILED DESCRIPTION OF THE INVENTION

Hereinafter, one embodiment of the present invention will be explained with reference to the drawings. It should be noted that the drawings shown hereinbelow are shown for explaining the constitutions of resin formed bodies including wood powder of this embodiment. Therefore, there is a possibility in which the size, thickness and the like of portions shown in drawings are different from size and the like of a real resin-formed body including wood powder or the like.

First Embodiment

Figure 1:
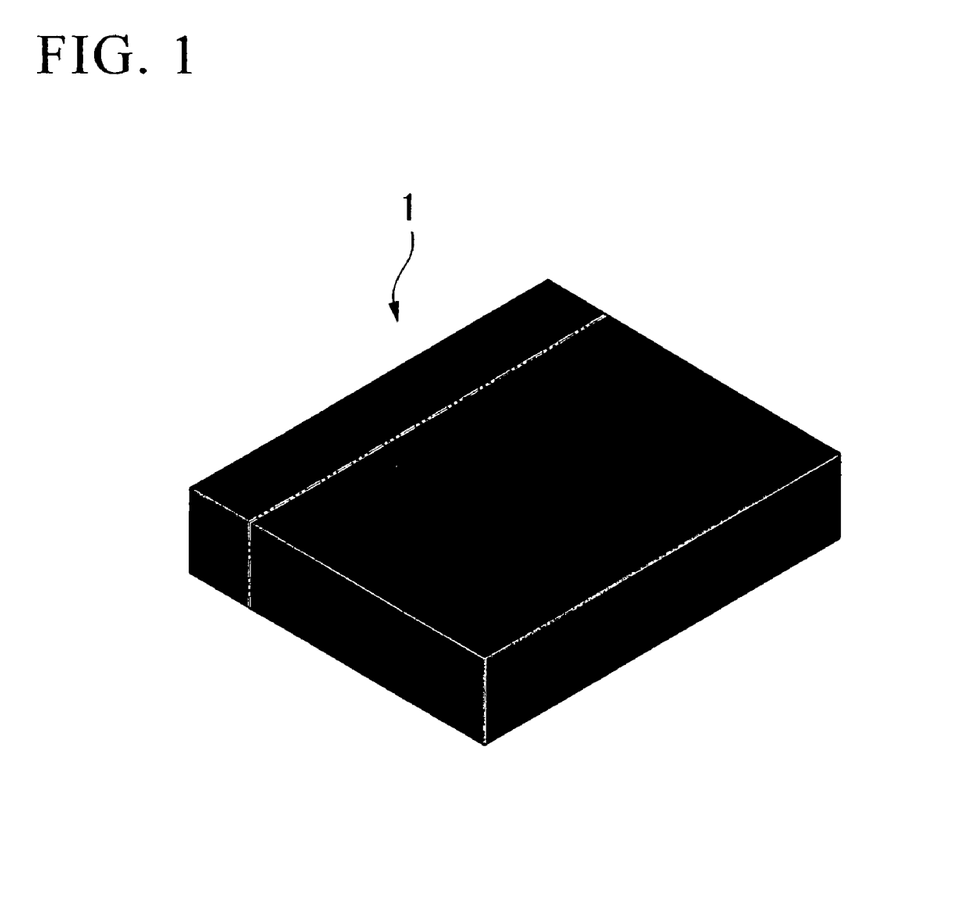
FIG. 1 is a perspective view which shows one example of a resin-formed body including wood powder of one embodiment.
Figure 2:
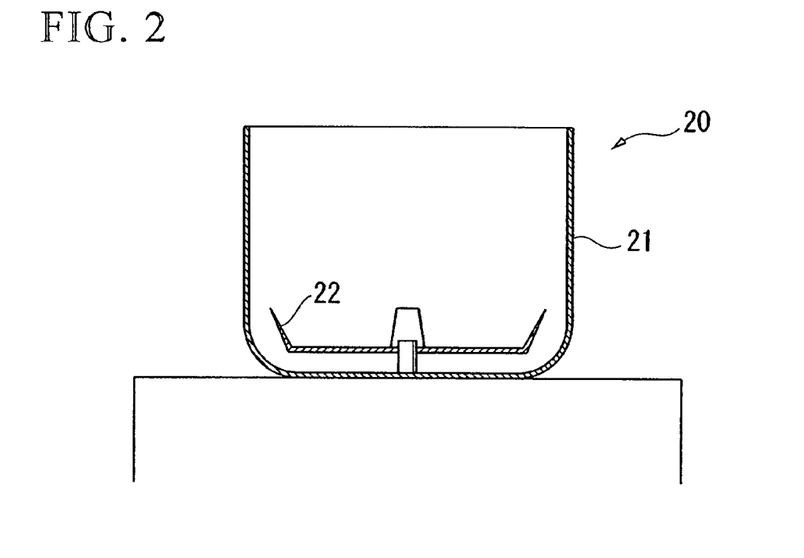
FIG. 2 is a schematic view for explaining one example of a production method of the resin-formed body including wood powder shown in FIG. 1.
Figure 3:
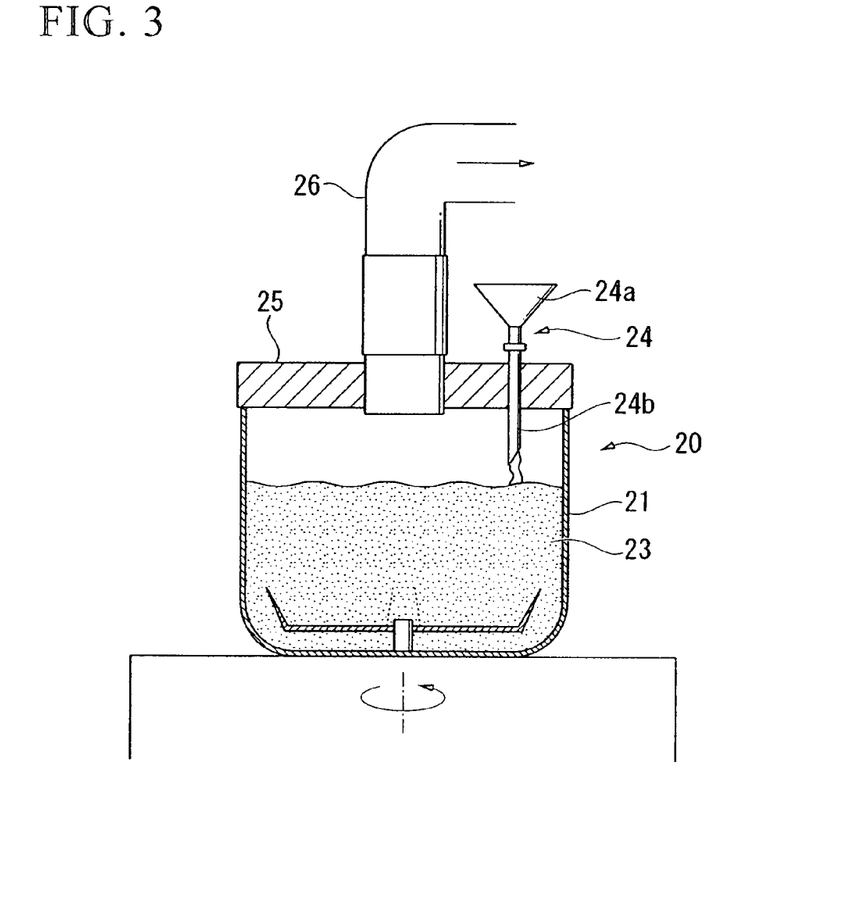
FIG. 3 is a schematic view for explaining one example of a production method of the resin-formed body resin-formed body including wood powder shown in FIG. 1.
Figure 4:
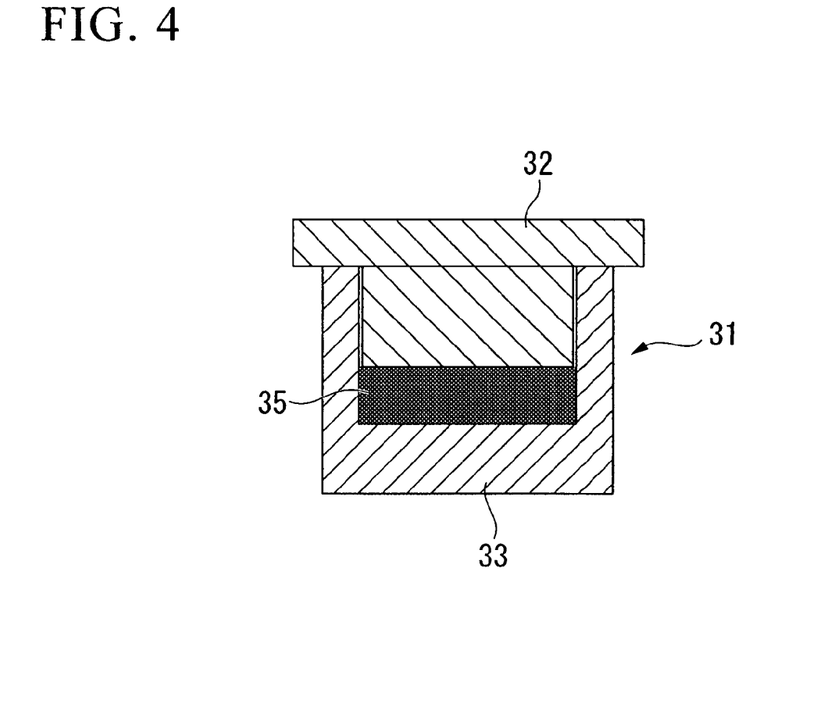
FIG. 4 is a schematic view for explaining one example of a production method of the resin-formed body including wood powder shown in FIG. 1.

FIG. 1 is a perspective view which shows one example of a resin-formed body including wood powder of this embodiment. FIGS. 2-4 are schematic view for explaining one example of a production method of the resin-formed body including wood powder shown in FIG. 1.

A resin-formed body including wood powder 1 shown in FIG. 1 contains wood powder colored black, resin colored black and black pigment, and has a plate shape.

In a case of producing the resin-formed body including wood powder 1, first, the wood powder is colored (coloring step). In this coloring step, for example, it is possible to use a mixer 20 as shown in FIG. 2. The mixer 20 shown in FIG. 2 includes a vessel 21 and rotating vanes 22 arranged at a bottom portion of the vessel 21. When the coloring step is conducted by using the mixer 20 shown in FIG. 2, first, a predetermined amount of wood powder is put into vessel 21 of the mixer 20.

With respect to the wood powder applied to the resin-formed body including wood powder 1, there is no limitation. However, for example, it is possible to use wood powder made from conifer. Moreover, it is preferable to use wood powder which has a smaller particle diameter or a smaller particle size because it is possible to obtain the resin-formed body including wood powder 1 which has uniform density, less differences and an excellent external appearance if the particle diameter is smaller. Concretely, it is preferable to use wood powder which has a particle diameter or a particle size of 300 μm or smaller, and more preferably 70-150 μm. If the wood powder has a particle diameter larger than 300 μm, there is a possibility in which it is not possible to have an external appearance and touch of the resin-formed body including wood powder sufficiently close to real wood.

Next, as shown in FIG. 3, a cover 25 which can tightly shut the vessel 21 is mounted on an upper surface of the vessel 21. As shown in FIG. 3, the cover 25 has a supplying unit 24. The supplying unit 24 is constituted from a material inlet 24a and a leg portion 24b which pierces through the cover 25. The supplying unit 24 can supply the material which is accepted by the material inlet 24a to an inside of the vessel 21 at a predetermined supplying speed. While the rotating vanes 22 are rotating in order to agitate inside the vessel 21, dyestuff solution including a predetermined amount of black dyestuff is supplied to the inside of the vessel 21 at a slow speed via the supplying unit 24. After that, the rotating vanes 22 keep rotating in order to agitate until the color of the wood powder becomes uniformly black.

The dyestuff solution including the black dyestuff used for coloring the wood powder can be obtained by diluting the black dyestuff with diluent.

There is no particular especial limitation on the black dyestuff which can color the wood powder black. Examples of the black dyestuff include direct dyes, metal complex dyes, oil color/solvent dyes, basic dyes, mordant dyes and reactive dyes. More concretely, examples of the black dyestuffs include Direct Black 51 as direct dyes, Acid Black 52 as metal complex dyes, Solvent Black 22 as oil color, Basic Black 2 as basic dyes, Mordant Black 11 as mordant dyes and Reactive Black 4 as reactive dyes.

Moreover, it is possible to apply an organic solvent, water, or the like as the diluent, and the diluent can be selected in accordance with types of the black dyestuffs and the like. It is preferable that a density of the black dyestuff (solid) included in the dyestuff solution be, for example, approximately 6-40% of mass ratio, and more preferably 5-40%.

It should be noted that the above-described method is not a limitation on the coloring step, and it is possible to apply other methods if the wood powder is colored. For example, it is possible to apply a method in which the wood powder is colored by soaking or immersing in the dyestuff solution including the black dyestuff.

Moreover, in the coloring step, in order to prevent the diluent of the dyestuff solution including the black dyestuff from forming dew on an inside wall of the vessel 21, it is possible to conduct operations of the coloring step while sucking inside the vessel 21 by using a suction pipe 26 provided on an upper portion of the cover 25.

Next, the diluent included in the dyestuff solution inside the vessel 21 is evaporated and the colored wood powder is dried. After that a resin, a black pigment and a compatibilizing agent are added to the vessel 21 shown in FIG. 3 to which the colored wood powder has already been added, and a mixture 23 is obtained by mixing (mixing step).

The resin used in this step is not limited. However, in order to prevent the wood powder from scorching in the mixing step or a forming step, it is possible to apply a resin which has a melting point of 250° C. or lower. Concretely, examples of the resin include one or more thermoplastic resins which are selected from polypropylene, polyethylene, polybutene, ABS (acrylonitrile-butadiene-styrene resin) and AS (acrylonitrile-styrene resin).

Moreover, it is possible to apply a mass ratio of the wood powder and the resin included in the mixture so as to be in a range of 90/10-50/50 (wood powder/resin), and more preferably 90/10-60/40. If the mass ratio of the wood powder and the resin exceeds 90/10, there are cases in which, for example, it is not possible to obtain sufficient surface hardness of the resin-formed body including wood powder, or in which the wood powder is removed and the surface becomes rough by friction, rubbing or the like because of insufficient bonding between the wood powder and the resin. On the other hand, it is not preferable that the mass ratio of the wood powder and the resin be lower than 50/50 because it is not possible to achieve quality of touch and the like sufficiently close to real wood.

Moreover, examples of the black pigment include carbon black, iron black and graphite. It is possible to add the pigment so as to be a mass ratio of 0.5-2% against a total mass of both the wood powder and the resin.

Examples of the compatibilizing agent include a modified polypropylene, a modified polyethylene and a modified styrene resin. It is possible to add the compatibilizing agent so as to be a mass ratio of 1-4% against a total mass of both the wood powder and the resin.

Next, the mixture 23 obtained in the mixing step is pulverized so as to have, for example, a particle diameter of 1 mm or smaller. After that, a compression molding machine shown in FIG. 4 forms the resin-formed body including wood powder 1 from the pulverized mixture (forming step). The compression molding machine shown in FIG. 4 has a metal mold 31 constituted from both an upper side mold 32 and a lower side mold 33. By combining both the upper side mold 32 and the lower side mold 33, the metal mold 31 shown in FIG. 4 forms a cavity 35 which has a shape corresponding to an external shape of the resin-formed body including wood powder 1. It is possible to form and obtain the resin-formed body including wood powder 1 by using the compression molding machine shown in FIG. 4. In this case, as shown in FIG. 4, the mixture is poured or injected into the cavity 35 of the metal mold 31, the mixture is compressed at a pressure of 15-18 MPa while being heated so as to be 160-180° C., and the mixture is cooled down so as to be 60° C. or lower in order to be solidified inside the cavity 35.

The resin-formed body including wood powder 1 includes both the wood powder colored black and the black pigment. Therefore, it is possible to apply the resin-formed body including wood powder 1 to a material for a black key having good external appearance and touch close to real wood with less difference in quality without using rare wood.

Moreover, colors of both the colored wood powder and the pigment of the resin-formed body including wood powder 1 of this embodiment are black. Therefore, not only the surface, but also the inside of the resin-formed body including wood powder 1 is black. Hence, for example, even if the wood powder appears on the surface because the resin-formed body including wood powder 1 is cut, the color of the wood powder is not an eyesore and there is no possibility of the external appearance deteriorating. Moreover, if the thermoplastic resin is used as the resin, chips generated when the resin-formed body including wood powder 1 is cut can be reused as a material for a resin-formed body including wood powder.

Second Embodiment

Figure 5:
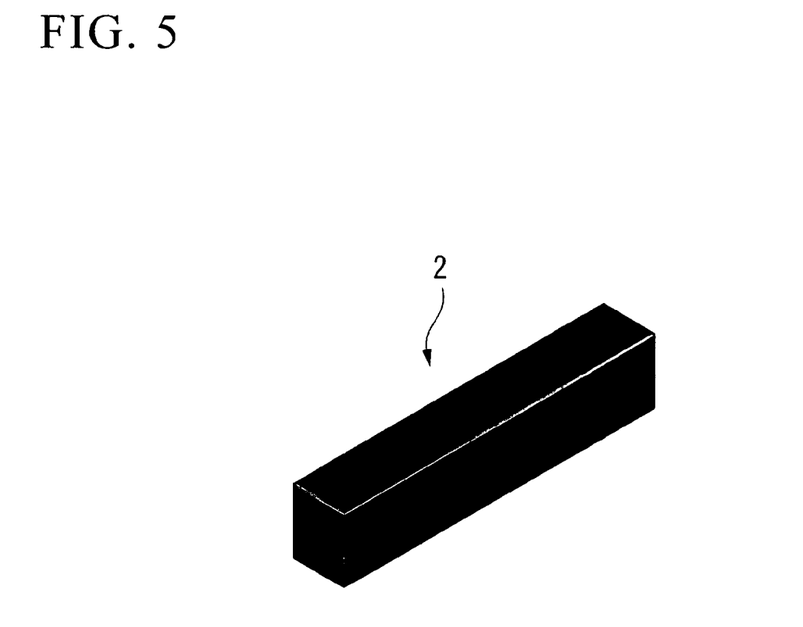
FIG. 5 is a perspective view which shows one example of a resin-formed body including wood powder of one embodiment.
Figure 6:
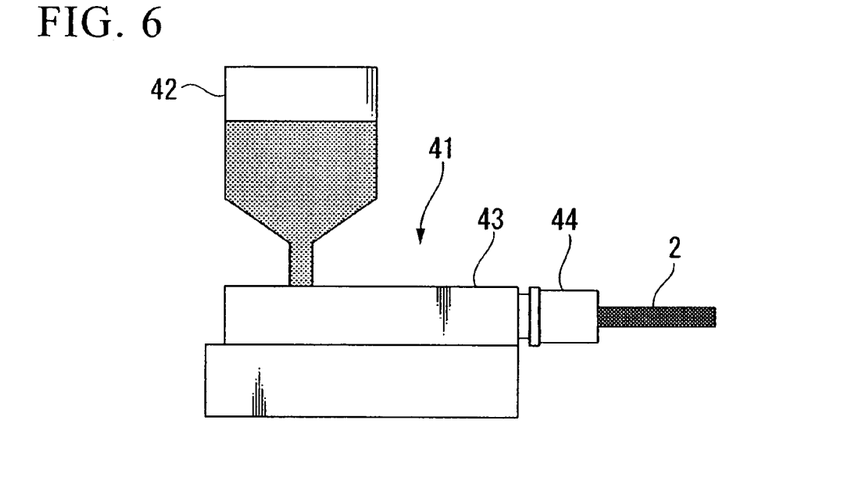
FIG. 6 is a schematic view for explaining one example of a production method of the resin-formed body including wood powder shown in FIG. 5.

FIG. 5 is a perspective view which shows one example of a resin-formed body including wood powder of this embodiment. FIG. 6 is a schematic view for explaining one example of a production method of the resin-formed body including wood powder shown in FIG. 5.

A resin-formed body including wood powder 2 of this embodiment has a rectangular cross section and is in a bar shape. As with the resin-formed body including wood powder 1 shown in FIG. 1, the resin-formed body including wood powder 2 includes wood powder colored black, resin and black pigment.

In a production step of the resin-formed body including wood powder 2 shown in FIG. 5, first, same as the resin-formed body including wood powder 1 shown in FIG. 1, the wood powder is colored (coloring step).

Next, after mixing the colored wood powder, resin, black pigment and a compatibilizing agent in order to obtain a mixture (mixing step), by using, for example, an extrusion molding machine 41 shown in FIG. 6, the mixture is extrusion-molded (forming step). The extrusion molding machine 41 shown in FIG. 6 has a material inlet 42, a heating cylinder 43 which has a screw inside and a die 44. In a case of conducting the mixing step and the forming step of the resin-formed body including wood powder 2 by using the extrusion molding machine 41 shown in FIG. 6, for example, a method can be applied in which a predetermined amount of the colored wood powder, resin, black pigment and the compatibilizing agent are put inside the heating cylinder 43 via the material inlet 42, and the screw is rotated at 1.5-7.5 rpm in order to mix while the mixture is heated inside the heating cylinder 43 at a temperature of 170-200° C. It should be noted that the temperature is more preferably 170-180° C. The resin-formed body including wood powder 2 can be obtained by extruding the mixture through the die 44 by applying pressure of 7-15 Mpa.

As with the resin-formed body including wood powder 1 shown in FIG. 1, the resin-formed body including wood powder 2 obtained in accordance with such a method includes wood powder colored black, resin and black pigment. Therefore, it is possible to apply the resin-formed body including wood powder 2 to a material for a black key having a good external appearance and touch close to real wood with less difference in quality without using rare wood.

Third Embodiment

A resin-formed body including wood powder 3 of this embodiment has a shape of a black key for a keyboard musical instrument. As with the resin-formed body including wood powder 1 shown in FIG. 1, the resin-formed body including wood powder 3 includes wood powder colored black, resin and black pigment.

Figure 7:
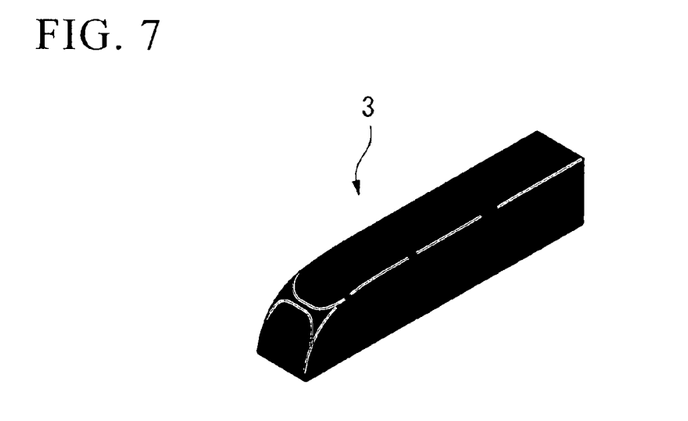
FIG. 7 is a perspective view which shows one example of a resin-formed body including wood powder of one embodiment.

In a production step of the resin-formed body including wood powder 3 shown in FIG. 7, first, as with the resin-formed body including wood powder 1 shown in FIG. 1, the wood powder is colored (coloring step). After mixing the colored wood powder, resin, black pigment and a compatibilizing agent in order to obtain a mixture (mixing step), the mixture is pulverized.

In this embodiment, it is possible to apply a mass ratio of the wood powder and the resin included in the mixture so as to be in a range of 80/20-50/50 (wood powder/resin), more preferably 70/30-60/40. If the mass ratio of the wood powder and the resin exceeds 80/20, it is not preferable because it is not possible to apply injection molding regardless of molding pressure due to insufficient fluidity and it is not possible to form in a shape of a black key.

Next, for example, the pulverized mixture is pushed and injection-molded by using an injection molder (forming step). In this forming step, the resin-formed body including wood powder 3 is obtained in a method in which, for example, by using a metal mold on which a cavity is formed which has a shape corresponding to an external shape of the resin-formed body including wood powder 3, the mixture is poured into the cavity of the metal mold, and the mixture is solidified by being heated and cooled down inside the cavity.

As with the resin-formed body including wood powder 1 shown in FIG. 1, the resin-formed body including wood powder 3 obtained in accordance with such a method includes the wood powder colored black, resin and black pigment. Therefore, it is possible to apply the resin-formed body including wood powder 2 to a material for a black key having a good external appearance and touch close to real wood with less differences in quality without using rare wood.

Fourth Embodiment

Figure 8:
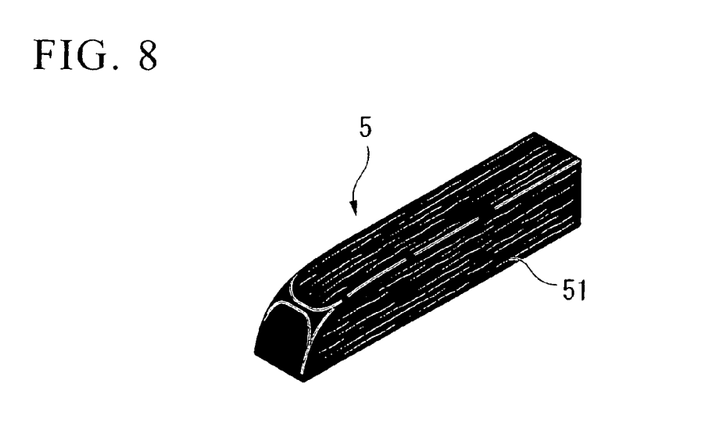
FIG. 8 is a perspective view which shows one example of a black key for a keyboard musical instrument.

FIG. 8 is a perspective view which shows one example of a black key made from a resin body including wood powder for a keyboard musical instrument in this embodiment.

A black key 5 of a keyboard musical instrument shown in FIG. 8 is obtained by applying the resin-formed body including wood powder 1 shown in FIG. 1. In production steps of the black key 5 shown in FIG. 8, for example, the resin-formed body including wood powder 1 shown in FIG. 1 in a plate shape is cut along a broken line shown in FIG. 1 so as to be in a strip shape. The resin-formed body including wood powder 1 is cut in order to form a predetermined shape. A grain pattern which is a pattern made by polishing with a surface treating material of non-woven fabric or a sandpaper is applied to a surface 51 of the resin-formed body including wood powder 1 (finishing step).

On the other hand, it is possible to produce the black key 5 shown in FIG. 8 by using the resin-formed body including wood powder 2 shown in FIG. 5 which has a rectangular cross section and is in a bar shape. In this case, it is possible to obtain the black key 5 in accordance with production steps in which the resin-formed body including wood powder 2 shown in FIG. 5 is cut in a predetermined length and cut so as to be in a predetermined shape. After that, a grain pattern which is typically observed on wood is applied to the surface 51 of the resin-formed body including wood powder 1 (finishing step).

Furthermore, it is possible to produce the black key 5 shown in FIG. 8 by using the resin-formed body including wood powder 3 shown in FIG. 7 which is in a shape of a black key for a keyboard musical instrument. In this case, it is possible to obtain the black key 5 in accordance with production steps in which the resin-formed body including wood powder 3 in a bar shape shown in FIG. 7 is polished in order to remove a resin layer on a surface of, for example, 10-200 µm from the surface of the resin-formed body including wood powder 3 so as to be in a predetermined shape. After that, a grain pattern which is typically observed on wood is applied to the surface 51 of the resin-formed body including wood powder 3 (finishing step).

It should be noted that, after the finishing step, it is possible to apply a paint such as a urethane coating or oil-based paint on the surface 51 of the black key 5 on which the grain pattern has been applied.

The black key 5 is obtained by using one of the resin formed bodies including wood powder shown in FIGS. 1, 5 and 7. Therefore, it is possible to obtain a black key which has good external appearance and touch close to real wood, and is applicable to playing without using rare wood. Moreover, compared to a black key for a keyboard musical instrument made from real wood, the black key 5 of the keyboard musical instrument shown in FIG. 8 can have less difference in quality.

In accordance with this embodiment, the wood powder is colored black and the pigment is a black pigment. Therefore, even if the wood powder appears on the surface by grinding the resin-formed body including wood powder in the finishing step, the wood powder shown on the surface is not an eyesore and the external appearance is not deteriorated.

In the above-described embodiments, examples are explained in which the wood powder is colored black, the pigment is a black pigment, and the resin formed bodies including wood powder are appropriate to a black key for the keyboard musical instrument. However, the color of the wood powder and the color of the pigment can be appropriately changed and are not limited. That is, even though it is preferable to apply dark or deep colors to both the color of the wood powder after being colored and pigment in order to avoid problems caused by changing the color of the wood powder because of heat and the like, it is possible to apply any colors. Moreover, both the wood powder after being colored and the pigment can be the same color or different colors, and it is possible to appropriately determine the colors in accordance with a design and the like.

In this case, it is possible to obtain a good external appearance with an excellent design and touch close to real wood, and there is no possibility in which the external appearance is deteriorated even if the wood powder appears on the surface.

Moreover, unlike a case of coloring the surface, there is no possibility in which the external appearance is deteriorated because the color is faded.

Moreover, apart from a black key for a keyboard musical instrument, it is possible to use the above-described resin-formed body including wood powder for, for example, structural materials, internal materials, and external materials of a musical instrument such as a keyboard musical instrument.

EXAMPLES 1-6

Six types of colored wood powder were obtained by coloring in accordance with steps (coloring step) including: putting the wood powder shown below into the vessel of the mixer 20 shown in FIG. 2; putting dyestuff solution which includes one of black dyestuffs A-D shown in Table 1 in accordance with the ratio shown in Table 2 into the vessel while the mixer 20 is rotating at 500 rpm; and rotating the mixer 20 at 1000 rpm until the color of the wood powder becomes uniform.

TABLE 1

| Dyestuff solution | | Concentration | Product name: manufacturer |
|---|---|---|---|
| A | Oil color | 6% | SP-BL-6-MH: Kitagawaseihinjo corporation |
| B | Oil color | 40% | Aizenspiron black MH S-liquid: Hodogaya industry co. ltd. |
| C | Metal complex dye | 3% | NEOLAN BLACK WA 200%: Nihon Ciba-Geigy K.K. |
| D | Metal complex dye | 25% | Aizenspiron black-1 W-liquid: Hodogaya industry co. ltd. |

TABLE 2

| Examples | Wood flour | Dyestuff solution | | | | Solid content consistency of dyestuff (%) | Color |
|---|---|---|---|---|---|---|---|
| | | A | B | C | D | | |
| 1 | 100 | 60 | | | | 3.6 | Black (○) |
| 2 | 100 | 30 | | | | 1.8 | Gray (x) |
| 3 | 100 | | 12 | | | 4.8 | Black (○) |
| 4 | 100 | | 20 | | | 8 | Black (○) |
| 5 | 100 | | | 50 | | 1.5 | Gray (x) |
| 6 | 100 | | | | 14.4 | 3.6 | Black (Δ) |

It should be noted that the wood powder had a particle diameter of 70-150 μm and was from a softwood (product name: LIGNOCEL S-150TR, produced by JRS PHARMA GMBH+CO.)

Moreover, in FIG. 2, the dyestuff solution indicates a ratio of the applied amount of the dyestuff solution (mass ratio) including the black dyestuff compared to an amount of the wood powder, which is indicated as 100. Moreover, the solid content consistency of the dyestuff is the weight of the black dyestuff which is solid content included in the wood powder (mass (%) concentration).

Colors of the wood powder of Examples 1-6 obtained in accordance with the above-described steps were observed with naked eye. It should be noted that in Table 2 "○" indicates "uniformly colored", "x" indicates that "most portions of the wood powder are not colored and gray as a whole", and "Δ" indicates that "black as a whole; however, uncolored portions of the wood powder are found here and there".

Table 2 shows observation results.

As shown in Table 2, in Example 1 to which dyestuff solution A having a solid content consistency of dyestuff of 3.6% was applied, in Example 3 to which dyestuff solution B having a solid content consistency of dyestuff of 4.8% was applied, in Example 4 to which dyestuff solution B having a solid content consistency of dyestuff of 8% was applied, and in Example 6 to which dyestuff solution D having a solid content consistency of dyestuff of 3.6% was applied, it was observed that the wood powder colored black was obtained which is appropriate for producing the resin-formed body including wood powder applied to the black key for the keyboard musical instrument.

After the above-described steps, the diluent included in the dyestuff solution of Examples 1-6 was evaporated and the colored wood powder was dried. After that, in accordance with a ratio shown in Table 3, a resin, a compatibilizing agent and a black pigment described below were added to the vessel of the mixer 20 to which the colored wood powder had already been added. A mixture was obtained by rotating the mixer 20 at 2800 rpm while being heated at 160-170° C. (mixing step). The obtained mixture was pulverized so as to have a particle diameter of 1 mm or less by using a pulverizer.

After that, the pulverized mixture was put into a cavity 35 of a metal mold 31 of the compression molding machine shown in FIG. 4. The resin inside the cavity was solidified while being heated at 160-180° C. and applying a pressure of 15-18 MPe (forming step), and the resin-formed body including wood powder was obtained.

TABLE 3

| Wood Flour | Resin | Compatibilizing agent | Black pigment |
|---|---|---|---|
| 80 | 20 | 2 | 1 |

It should be noted that polypropylene (PP) (product name: PM930V, produced by SunAllomer Ltd.) is applied as the resin. Carbon black (product name: PBF-640BL, produced by Resino Color Industry CO., LTD.) is applied as the black pigment. A maleic acid-modified polypropylene (product name: yumex1010, produced by Sanyo Chemical Industry Ltd.) is applied as the compatibilizing agent.

In Table 3, values corresponding to the wood powder and the resin indicate mass ratio between the wood powder and the resin. A value corresponding to the compatibilizing agent indicates a mass of the compatibilizing agent compared to total mass of both the wood powder and the resin. A value corresponding to the pigment indicates a mass of the pigment compared to the total mass of both the wood powder and the resin.

Regarding the resin formed bodies including wood powder made by using the colored wood powder of Examples 1-6 and by using a compression molding machine, the external appearance was observed with the human eye and the touch was checked by touching with the hands. As a result, it was confirmed that the resin formed bodies including wood powder had an excellent external appearance and touch close to real wood.

On the other hand, the colored wood powder of Examples 1-6, the resin, the black pigment and the compatibilizing agent as described above are put into the heating cylinder 43 via the material inlet 42. The screw is rotated at 1.5-7.5 rpm in order to mix while the mixture is heated inside the heating cylinder 43 at a temperature of 170-180° C. The resin-formed body including wood powder 2 was obtained by extruding the mixture via the die 44 by applying a pressure of 7-15 Mpa.

Regarding the resin formed bodies including wood powder made by using the colored wood powder of Examples 1-6 and by using an extrusion molding machine, the external appearance was observed with the human eye, and touch was checked by touching with the hands. As a result, it was confirmed that the resin-formed body including wood powder had excellent an external appearance and touch close to real wood.

Comparative Example

A resin-formed body including wood powder of this Comparative example was obtained in a manner in which the mixing step was conducted in the same way as Examples 1-6 except for using the non-colored wood powder because the coloring step was not conducted. The forming step was conducted in the same way as the Examples 1-6 by using a compression forming machine.

With respect to both the resin-formed body including wood powder of the Comparative example obtained in accordance with the above-described manner and the resin formed bodies including wood powder obtained by being compression-formed and by using the colored wood powder of Examples 1-6, the cross-sections were observed after cutting. The observation results are shown in FIGS. 9A and 9B.

Figure 9A:
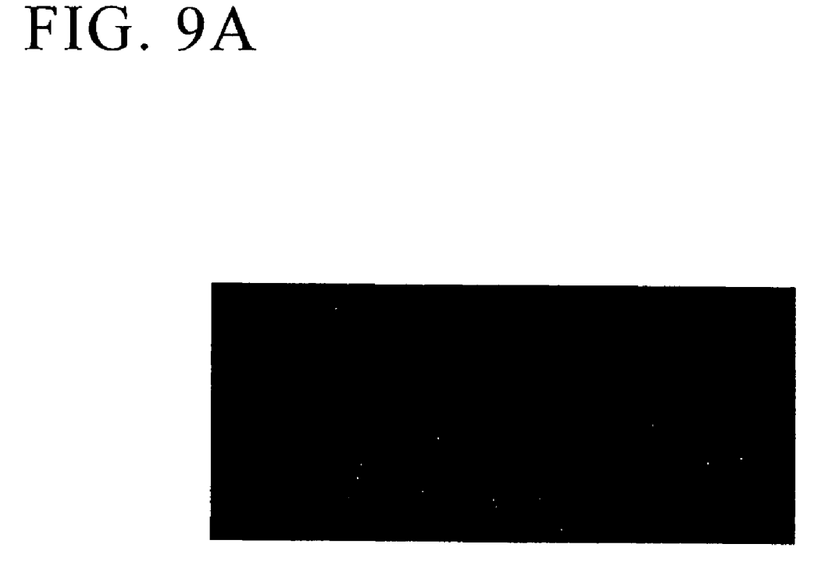
FIGS. 9A and 9B are pictures showing cross-sections of the resin formed bodies including wood powder.
Figure 9B:
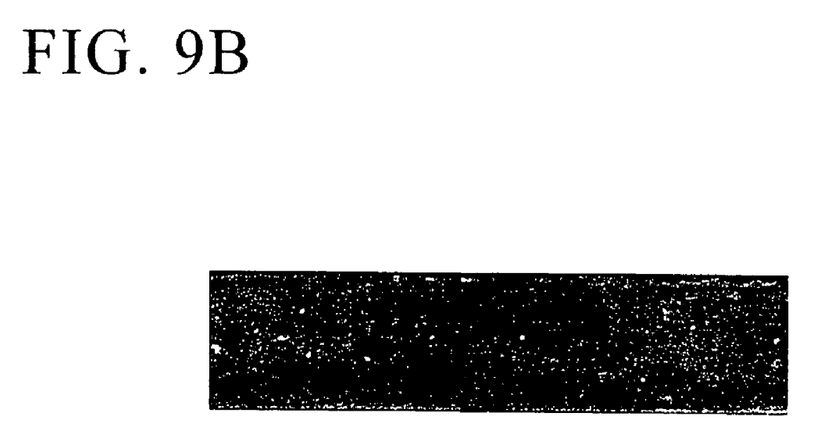

FIGS. 9A and 9B are pictures showing cross sections of the resin formed bodies including wood powder. FIG. 9A shows the resin formed bodies including wood powder to which the wood powder of Examples 1-6 was applied, and FIG. 9B shows the resin-formed body including wood powder of Comparative example.

As shown in FIG. 9A, with respect to the resin formed bodies including wood powder to which the wood powder of Examples 1-6 was applied, the color of the wood powder which appeared on the cross-section was not an eyesore and the cross-section had an excellent external appearance.

However, as shown in FIG. 9B, regarding the resin formed bodies including wood powder of Comparative example, the color of the wood powder that appeared on the cross-section was an eyesore.

<Forming Method of Resin-Formed Body Including Wood Powder, Types of Resin and Ratio of Wood Powder and Resin>

After producing prototypes of the resin-formed body including wood powder, it was observed that a preferable mixing ratio of the wood powder and the resin was different according to the forming method and types of the resins used. Therefore, the prototypes of the resin-formed body including wood powder were produced while applying variety of mixing ratios of the wood flour and the resin in order to evaluate the prototypes. It should be noted that 3 types of forming methods (press-molding, extrusion-molding and injection molding) and 2 types of resins (PE, PP, and the like and ABS, AS, and the like) were applied to the prototypes of the resin-formed bodies including wood powder. Table 4 shown below was shows the results.

TABLE 4

| Forming method | Examples of resins | Preferable mixing ratio (mass (%)) | | More preferable mixing ratio (mass (%)) | |
|---|---|---|---|---|---|
| | | Wood powder | Resin | Wood powder | Resin |
| Pressing | PE, PP, and the like | 90-50 | 10-50 | | |
| | ABS, AS, and the like | 80-50 | 20-50 | 70-60 | 30-40 |
| Extrusion-molding | PE, PP, and the like | 90-50 | 10-50 | | |
| | ABS, AS, and the like | 70-50 | 30-50 | 70-60 | 30-40 |
| Injection-molding | PE, PP, and the like | 80-50 | 20-50 | | |
| | ABS, AS, and the like | 70-50 | 30-50 | 70-60 | 30-40 |

As a result of testing the prototypes, when the mixing ratio was out of range of those shown in Table 4 above, problems were found in that it was not possible to obtain the resin-formed body including wood powder having preferable forming characteristics. For example, it was not possible to obtain preferable forming characteristics of the resin-formed body including wood powder if the mass (%) of the wood powder exceeded the range shown in Table 4.

Moreover, when the mass (%) of the resin exceeded the range shown in Table 4, it was not possible to obtain a black key made from the resin-formed body including wood powder which had satisfactory characteristics of real wood with respect to the appearance and touch.

In other words, when the mass (%) of the resin exceeded the range shown in Table 4, the appearance and touch of the black key was similar to plastic.

It was not possible to use such a black key in place of a black key made from real wood which has been generally used. It should be noted that if the mass (%) of the wood powder is larger, the appearance and touch of the black key is closer to real wood.

Fifth Embodiment

Next, various prototype black keys were produced by applying various mixing ratios (mass (%)) of the wood powder and the resin, and darkness, luster, touch and fastness to rubbing of the black keys were evaluated. As with the description above, it should be noted that the wood powder had a particle diameter of 70-150 μm and was from a softwood (product name: LIGNOCEL S-150TR, produced by JRS PHARMA GMBH+CO.)

As the oil-soluble dye, as shown in Table 1, SP-BL-6-MH produced by Kitagawaseihinjo corporation was applied.

In this embodiment, the concentration of the oil-soluble dye was 6%.

Moreover, the ratio of weight of the dye liquid (oil-soluble dye) was 60 when the wood powder was 100.

Moreover, as shown in Table 5, the resin was PP and ABS. The mixing ratio (mass (%)) of the wood powder and the PP was from 95/5 to 60/40. The mixing ratio (mass (%)) of the wood powder and the ABS was from 70/30 to 50/50. It should be noted that the ratio of weight of the compatibilizing agent was 2 and the ratio of weight of the black pigment was 1 when the sum of the wood powder and the resin was 100.

Moreover, with respect to a forming method, press molding was conducted while heating the material at 180° C. and applying the pressure of 15-18 MPa. After this pressing step, a plate-shaped body was obtained of 305 mm in length, 55 mm in width and 15 mm in thickness.

It should be noted that an evaluation method was applied in which the plate-shaped body obtained in the above-described step was cut to substantially the same size as the black key. The plate-shaped body which was cut was evaluated with respect to darkness, luster, touch and fastness to rubbing. Table 5 below shows the evaluation results.

TABLE 5

| | Mixing ratio (mass (%)) | | Evaluation | | | |
|---|---|---|---|---|---|---|
| Resin | Wood powder | Resin | Darkness | Luster | Touch | Fastness to rubbing |
| PP | 95 | 5 | A | B | C | C |
| | 80 | 20 | A | B | A | B |
| | 70 | 30 | A | B | A | A |
| | 60 | 40 | A | A | A | A |

TABLE 5-continued

| Resin | Mixing ratio (mass (%)) | | Evaluation | | | |
|---|---|---|---|---|---|---|
| | Wood powder | Resin | Darkness | Luster | Touch | Fastness to rubbing |
| ABS | 70 | 30 | A | A | A | A |
| | 60 | 40 | A | A | A | A |
| | 50 | 50 | A | A | B | A |

As shown in Table 5 above, it should be noted that an example to which PP was applied and which had a mixing ratio of 95/5 of the wood powder and the resin was a prototype for comparison. This example could not obtain preferable results.

Regarding "darkness" and "luster" shown in Table 5, "A"-"C" indicate evaluation results with respect to practicability evaluated by the naked eye. First, "A" indicates excellent (the same level as or better than the black key made from wood which has been generally used).

"B" indicates a level that can be practically used as the black key (the same level as or slightly poorer than the black key made from wood which has been generally used). This is the level at which, for example, the black key had an evaluation of having less luster than A.

"C" indicates a level that cannot be practically used as the black key.

C includes cases such that a dying state of the wood powder is poor, the color is close to gray because of lack of black pigment, and the like.

Moreover, C includes a case such that the black key has less luster than the black key which has been generally used, and the black key looks whitish as a whole.

Regarding "touch" in Table 5, "A"-"C" indicate evaluation results with respect to practicability as the black key evaluated by a sensory evaluation. First, "A" indicates excellent (the same level as or better than the black key made from wood which has been generally used).

"B" indicates a level that can be practically used as the black key (the same level as or slightly poorer than the black key made from wood which has been generally used). This is the level at which, for example, the black key is closer to plastic than A. Practically, B includes cases, for example, in which the black key is rough or has a sandy touch compared to A.

"C" indicates a level that cannot be practically used as the black key. C includes cases such that, for example, there is obviously a sandy touch, touch by the finger is not smooth and is unusually rough, and the like.

Regarding "fastness to rubbing" in Table 5, "A"-"C" indicate evaluations based on test results obtained by using a tester of fastness to rubbing. In this test, the tester of fastness to rubbing pushes a sheet of gauze on the black key while applying 500 g weight and moving back and forth for 3500 times. In other words, "A"-"C" are evaluations obtained by looking at the stained or migrated color of the gauze by the naked eye.

First, "A" indicates excellent (the same level as or better than the black key made from wood which has been generally used). In other words, based on a stained or migrated color of the gauze in a case of testing of the conventional black key made from wood, A indicates the same level or less stained or migrated color than the conventional black key made from wood.

"B" indicates a level that can be practically used as the black key (the same level as or slightly poorer than the black key made from wood which has been generally used). In other words, based on a stained or migrated color of the gauze in a case of testing of the conventional black key made from wood, B indicates the same level or slightly more strongly stained or migrated color than the conventional black key made from wood.

"C" indicates a level that cannot be practically used as the black key. C includes cases such that the wood powder is removed or the stained or migrated color of the gauze is significant.

In Table 5, in a case of using PP as the resin and applying 60/40 as the mixing ration of the wood powder and the resin, it was possible to obtain a significantly preferable result.

Moreover, in a case of using ABS as the resin and applying 70/30 or 60/40 as the mixing ratio of the wood powder and the resin, it was possible to obtain a significantly preferable result as well.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A black key for a keyboard musical instrument which is made from a resin-formed body, wherein the resin-formed body comprises:
    wood powder previously colored with dyestuff; and
    an acrylonitrile-butadiene-styrene resin,
    wherein the resin-formed body has uniform quality in external appearance.

2. The black key for a keyboard musical instrument according to claim 1, wherein a mass ratio between the wood powder and the resin is 90/10-50/50 (the wood powder/resin).

3. A black key for a keyboard musical instrument which is made from a resin-formed body, wherein a production method of the resin-formed body comprises:
    a coloring step of coloring wood powder with dyestuff to obtain colored wood powder;
    a mixing step in which the colored wood powder, an acrylonitrile-butadiene-styrene resin and pigment are mixed in order to obtain a mixture; and
    a forming step of forming the mixture so as to obtain the resin-formed body having uniform quality in external appearance.

4. The black keyboard musical instrument according to claim 3, wherein the production method of the resin-formed body further comprises a finishing step in which, after the forming step, the resin-formed body is ground in order to form a predetermined shape and a grain pattern is applied.

* * * * *